Aug. 2, 1927.
F. J. LAHER
1,637,752
COMBINED AUTOMOBILE LUGGAGE CARRIER AND BUMPER
Filed March 2, 1927 3 Sheets-Sheet 1
FIG.1.
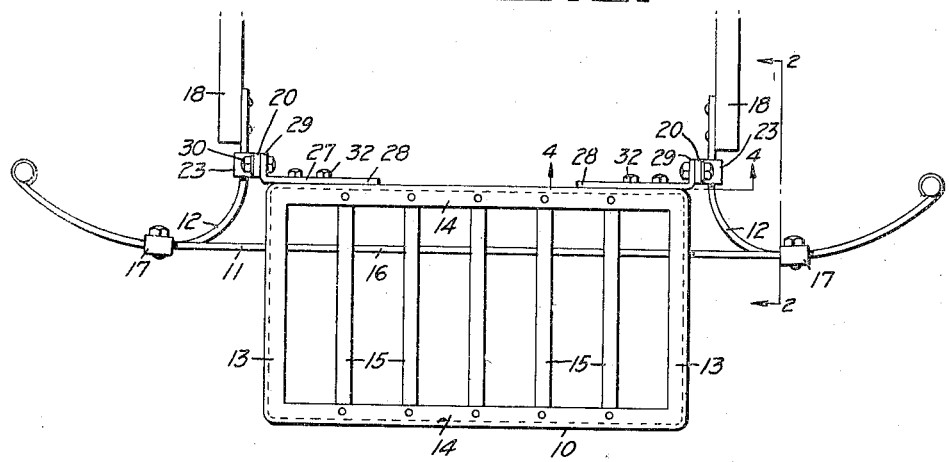
FIG.2.
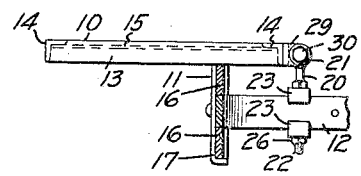
FIG.3. FIG.4.
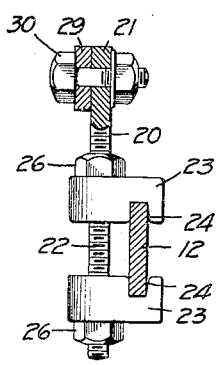 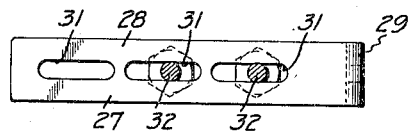
INVENTOR
Frank J. Laher
BY White, Prost & Fryer
his ATTORNEYS Aug. 2, 1927.  1,637,752
F. J. LAHER
COMBINED AUTOMOBILE LUGGAGE CARRIER AND BUMPER
Filed March 2, 1927    3 Sheets-Sheet 3

INVENTOR
Frank J. Laher
BY
White, Prost & Fryer
his ATTORNEYS

Patented Aug. 2, 1927.

1,637,752

UNITED STATES PATENT OFFICE.

FRANK J. LAHER, OF OAKLAND, CALIFORNIA.

COMBINED AUTOMOBILE LUGGAGE CARRIER AND BUMPER.

Application filed March 2, 1927. Serial No. 171,954.

This invention relates generally to luggage carriers adapted to be secured to an automobile or other vehicle.

Luggage carriers usually comprise a rack pivotally mounted upon an automobile so that it may be swung into an out of the way position when not in use. It has previously been proposed to mount such racks directly to the rear bumper of an automobile. Bumpers however differ widely in size and construction and with prior devices it has been impossible to adapt a particular luggage carrier to all different kinds of bumpers without employing a number of different clamping or attaching brackets. This inherent disadvantage has restricted their sale and increased the cost of manufacture.

It is an object of this invention to devise a luggage carrier mounting which may be adjusted to cooperate with any style or size of automobile bumper.

It is a further object of this invention to devise a luggage carrier in which the pivotal mounting of the luggage carrier is adapted to be secured to the support members, fittings, or other parts of a bumper or to other suitable portions of an automobile and in which the impact member of the bumper serves as a rest for the rack when in operative position.

Further objects of this invention will appear from the following description in which I have set forth the preferred embodiment of my invention. It is to be understood that the scope of the invention is to be determined by the appended claims and the state of the prior art.

Referring to the drawing:

Figure 1 is a plan view of a luggage carrier constructed in accordance with the principles of this invention and shown as attached to one standard form of automobile bumper.

Fig. 2 is a cross sectional detail taken along the line 2—2 of Fig. 1.

Fig. 3 is a detail of the universal mounting for the luggage carrier.

Fig. 4 is a cross sectional detail view taken along the line 4—4 of Fig. 1.

Figure 5:
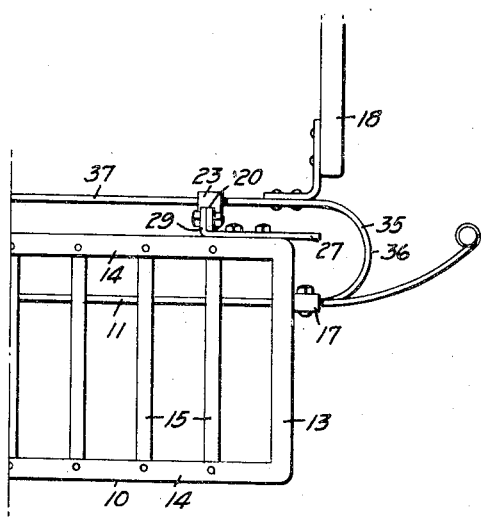
Figs. 5 and 6 illustrate different ways in which the luggage carrier may be mounted upon a different form of bumper.

The device comprises generally a mounting for the pivotal connection of a luggage carrier rack, which mounting is provided with various adjustments whereby it may be clamped to the support bars of any standard type of bumper or to other convenient portions of an automobile. This mounting preferably comprises a plurality of members which are provided with bearing portions adapted to be pivotally connected to the luggage carrier rack. The means for clamping these members to the bumper support bars permits alinement of the bearing portions and also provides for their vertical adjustment so that the rack will rest upon the bumper impact bars when in horizontal position.

Thus referring to the drawings, there is shown a luggage carrier rack 10 of any suitable construction which is shown as mounted upon an automobile bumper comprising impact and support members 11 and 12 respectively. The rack may be constructed of a pair of end rails 13 connected by a pair of front and rear rails 14, the rails 14 being interconnected by cross bars 15. The particular type of bumper illustrated comprises a pair of impact bars 16 retained in place in vertical relationship by means of clamps 17. The impact bars are retained in operative position upon an automobile by means of the support bars or members 12 which are connected at their outer ends to the spaced clamps 17 and are curved inwardly and rearwardly to connect with the automobile frame 18.

The mounting for the rack 10 preferably comprises a pair of members 20 which are provided with bearing portions 21. In the preferred construction each of the members 20 is constructed in the form of an eye bolt having a relatively long threaded stem 22, the bearing portion 21 being the eye of the bolt. For clamping these members 20 to any convenient part of an automobile each member is provided with a pair of clamping jaws 23 which are apertured to slidably receive the threaded stem 22. The jaws 23 are provided with opposed notches or grooves 24 which are adapted to fit over upper and lower edges of one of the bars of the bumper, as for example the support bar 12. A pair of nuts 26 are provided upon the threaded stem 22 whereby the jaws 23 may be clamped in tight engagement with the bar 12. By adjustment of the nuts 26 it is obvious that the bearing portion 21 of each member 20 may be adjusted vertically with respect to the support bar 12 or other member to which the device is clamped, and that the bearing member may also be adjusted angularly; that is, the stem 22 may be rotated so as to bring the bearing member 22 into any desired position irrespective of the angle of the support bar 12.

The bearing portions 21 are preferably pivotally connected to the luggage rack 10 by means of a pair of brackets 27, which are preferably L-shaped, the leg 28 of each L being secured to the real rail 14 while the leg 29 is pivotally secured to the corresponding bearing portion 21 as by means of a bolt 30. In order to permit the bearing portions 21 being spaced at varying distances apart depending upon the type of bumper to which the device is applied, the leg 28 of each bracket 27 is preferably laterally adjustable as for example by providing slots 31 through which extend the securing bolts 32 for clamping the brackets to the luggage rack.

In attaching the device the jaws 23 are first engaged with a convenient support bar or other part of the automobile to the rear of the impact member of the bumper so that the bearing portions 21 will be spaced approximately the length of the luggage rack 10. Because the bearing portions 21 may be adjusted angularly with respect to the jaws 23 these portions may then be accurately alined to receive the bolts 30 for pivotally connecting them to the legs 29 of the brackets 27. The brackets 27 are of course adjusted laterally in order to permit the adjacent faces of the leg 29 and bearing portions 21 to come into contact. As the members 20 are mounted at points spaced rearwardly from the impact bars 16, when the rack 10 is swung down into operative position the end rails 13 will abut and rest upon the upper impact bar 16. As the impact and support bars of different bumpers are of varying widths it is necessary to provide for vertical adjustment of the bearing members 21 in order to bring the rack into horizontal position. This is accomplished by screwing the nuts 26 up or down the threaded stem 22 until the desired position is obtained, after which the nuts are tightly clamped together to permanently engage the jaws 23 with the support bar 12.

Figure 6:
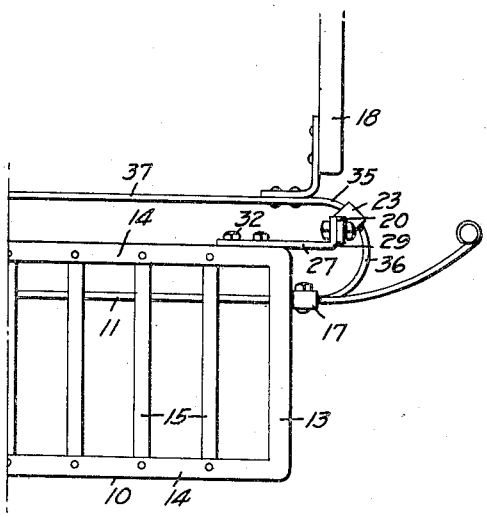
Figure 7:
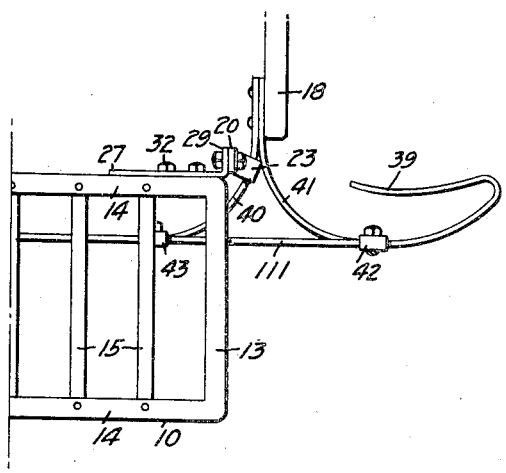
Figs. 7 and 8 illustrate different ways in which the luggage carrier may be mounted upon another form of bumper.
Figure 8:
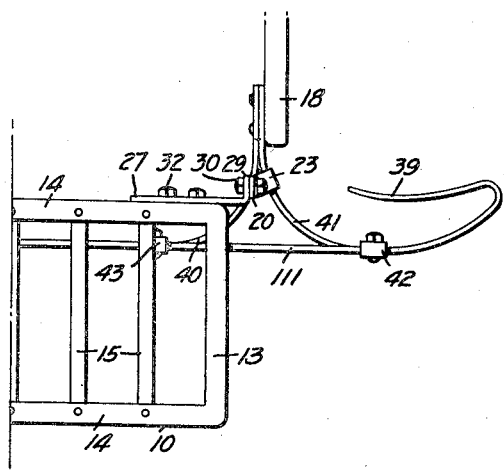

Figs. 5 and 6 illustrate how the device may be incorporated in a different type of bumper in which the impact member 11 is supported by means of a looped cushion bar 35 which for example may be provided with an outer looped portion 36 and an inner connecting straight portion 37. As shown in Fig. 5 the jaws 23 may be engaged with the straight inner portion 37 and the brackets 27 reversed to position the leg 29 at a point intermediate the ends of the luggage rack. As shown in Fig. 6, the jaws 23 may be engaged with the curved portion 36, the angular adjustment of the member 20 permitting the bearing portions 21 to be accurately alined. In this case since the bearing portions 21° are spaced relatively far apart, it is necessary to extend the brackets 27 to bring the legs 29 to a position beyond the end rails 13. In Figs. 7 and 8 the device has been shown as applied to a bumper in which the impact member 111 is provided with looped ends 39. The support bars of this bumper have been shown as comprising divergent bars 40 and 41 which are secured at their outer ends to clamps 42 and 43. Fig. 7 shows the jaws 23 as being mounted upon the support bar 40 while Fig. 8 illustrates how they may be engaged with the bar 41 and the brackets 27 adjusted so as to compensate for the increased distance between the bearing portions 21.

Figure 9:
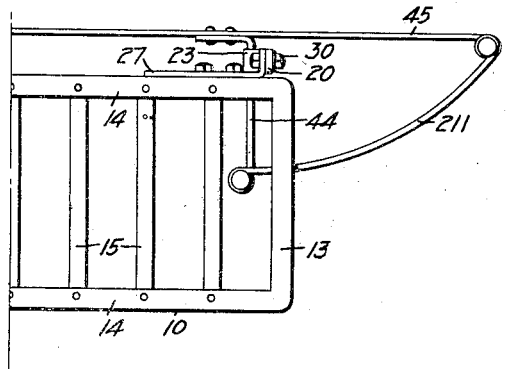
Figs. 9 and 10 are plan views illustrating different ways in which the luggage carrier may be mounted upon a wing type of bumper.
Figure 10:
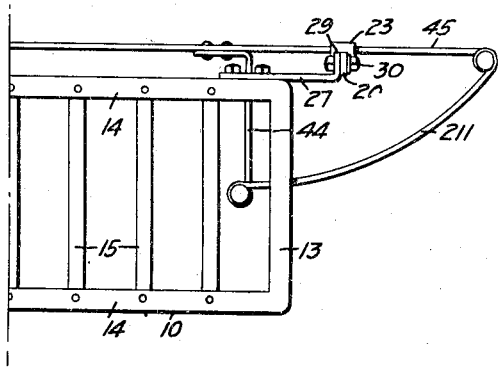

In Figs. 9 and 10 the device has been shown as incorporated with a conventional type of wing bumper which for example may comprise a curved impact member 211 connected at its ends to support bars 44 and 45 which are suitably secured to an automobile frame. In Fig. 9 the jaws 23 have been clamped to the support bar 44 while in Fig. 10 the jaws 23 have been shown as secured to the bar 45. In either case the end rails 13 of the luggage rack are adapted to rest upon the impact member 211.

Figure 11:
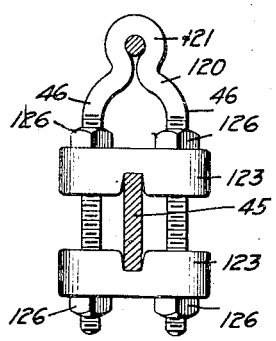
Fig. 11 is a detail view illustrating a modified form of pivotal mounting for the luggage carrier.
Figure 12:
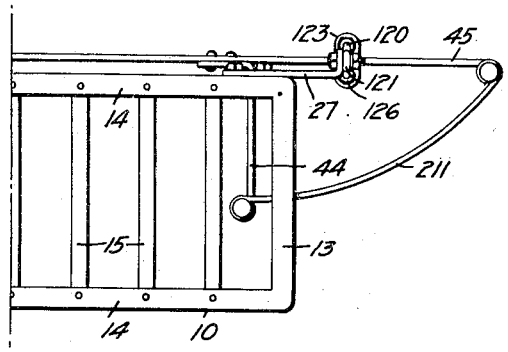
Fig. 12 illustrates the manner in which the pivotal mounting shown in Fig. 11 may be applied to a standard form of bumper.

Figs. 11 and 12 illustrate another form of clamping device which incorporates several of the desirable features of my invention, although it is not the preferred construction. In this case the member 120 corresponds generally to the member 20 previously described. However, this member 120 is constructed of a pair of spaced threaded legs 46 having their upper ends interconnected by means of an eye 121 which corresponds generally to the eye 21 of the member 20. The clamping jaws 123 are provided with a pair of spaced apertures to receive the legs 46 and are clamped to a convenient portion of a bumper such as the support bar 45 by means of the nuts 126 which are threaded upon the legs 46. With this type of mounting however there is no provision for angularly adjusting the bearing portions 121 so that as illustrated in Fig. 12, it must be secured to a portion of a bumper which extends parallel to the pivotal axis of the rack. Thus as shown in the latter figure it has been secured to the support bar 45 of a wing type of bumper such as shown in Figs. 9 and 10.

I claim:

1. A combined luggage carrier and automobile bumper comprising a rack, means for pivotally securing said rack to an automobile bumper whereby it may be swung about a horizontal axis, means forming a fixed rest for said rack when in operative position, and means for vertically adjusting said pivotal securing means with respect to said rest.

2. A combined luggage carrier and bumper comprising a rack, and means for pivotally securing said rack to an automobile whereby it may be swung about a horizontal axis, said rack being adapted to rest upon the impact member of the bumper when in operative position, said securing means being vertically adjustable with respect to the impact member of the bumper.

3. A combined luggage carrier and automobile bumper comprising a rack, means for securing said rack to an automobile comprising a plurality of members having bearing portions, means for securing said members to the support bars of an automobile bumper, said means permitting alinement of said bearing portions irrespective of the nature of said bars, and means for pivotally securing said bearing portions to said rack.

4. A luggage carrier in combination with an automobile bumper comprising a rack, means for securing said rack to an automobile comprising two members having bearing portions, means for securing said members in spaced relationship to the support bars of the bumper, said means permitting angular adjustment of said bearing members whereby said bearings may be alined, and means for pivotally securing said bearing portions to said rack.

5. A combined luggage carrier and automobile bumper comprising a rack, and means for securing said rack to an automobile comprising two members pivotally secured at spaced points to said rack and clamping means for securing said members to convenient portions of an automobile bumper, said clamping means being adjustable about a vertical axis with respect to said member.

6. A combined luggage carrier and automobile bumper comprising a rack, and means for securing said rack to an automobile comprising two members pivotally secured at spaced points to said rack and clamping means for securing said members to convenient portions of an automobile bumper, said clamping means permitting relative vertical and angular adjustment between said clamping means and said members.

7. A combined luggage carrier and automobile bumper comprising a rack, two members pivotally connected to said rack, means permitting horizontal adjustment of said members with respect to said rack, means for securing said members to an automobile bumper, said means being angularly adjustable with respect to said members, and means on the bumper forming a rest for said rack when in operative position.

8. A combined luggage carrier and automobile bumper comprising a rack, a pair of attachment members secured to the bumper, a journal portion formed on each of said attaching members, means for securing said attaching members to a fixed support, said means permitting alinement and vertical adjustment of said attaching members, and means for pivotally connecting said journal members to said rack.

9. A combined luggage carrier and automobile bumper comprising a rack, a pair of threaded members, means for pivotally securing said threaded members to said rack, a pair of jaws cooperating with said members, and a pair of nuts threaded on said members whereby said jaws may be clamped to a convenient portion of an automobile bumper.

10. A luggage carrier adapted to cooperate with an automobile bumper having impact and support members, comprising a rack, and means for pivotally securing said rack to said support bars, said rack being adapted to rest upon the impact member when in operative position, said securing means being vertically adjustable with respect to the impact member.

11. A luggage carrier adapted to cooperate with an automobile bumper comprising a rack, means for securing said rack to an automobile comprising a plurality of members having bearing portions, means for securing said members in spaced relationship to the support bars of the bumper, said members being angularly adjustable whereby said bearing portions may be alined, and means for pivotally securing said bearing portions to said rack.

In testimony whereof, I have hereunto set my hand.

FRANK J. LAHER.